United States Patent
Persson

(10) Patent No.: US 6,810,914 B2
(45) Date of Patent: Nov. 2, 2004

(54) METHOD AND ARRANGEMENT TO ACCOMPLISH A ONE-WAY FLOW

(75) Inventor: Mats Persson, Kremelvägen 7, S-374 40 Karlshamn (SE)

(73) Assignee: Mats Persson, Karlshamn (SE)

(*) Notice: Subject to any disclaimer, the term of this patent is extended or adjusted under 35 U.S.C. 154(b) by 0 days.

(21) Appl. No.: 10/184,909

(22) Filed: Jul. 1, 2002

(65) Prior Publication Data

US 2004/0000348 A1 Jan. 1, 2004

Related U.S. Application Data

(63) Continuation of application No. PCT/SE00/02524, filed on Dec. 14, 2000.

(30) Foreign Application Priority Data

Jan. 4, 2000 (SE) .......................................... 0000013-3

(51) Int. Cl.[7] .............................................. F16K 15/14
(52) U.S. Cl. ...................................... 137/853; 137/496
(58) Field of Search ................................ 137/843, 852, 137/853, 496

(56) References Cited

U.S. PATENT DOCUMENTS

| 3,982,723 A | | 9/1976 | Ford et al. | |
|---|---|---|---|---|
| 4,300,748 A | * | 11/1981 | Kreeley | 251/5 |
| 4,489,750 A | * | 12/1984 | Nehring | 137/496 |
| 4,783,045 A | | 11/1988 | Tartaglino | |
| 4,995,864 A | * | 2/1991 | Bartholomew et al. | 604/153 |

FOREIGN PATENT DOCUMENTS

| HU | P9300329 | | 8/1991 | |
|---|---|---|---|---|
| JP | 7248151 | | 9/1995 | |
| SE | 183 622 | * | 5/1963 | 137/853 |

* cited by examiner

Primary Examiner—Ramesh Krishnamurthy

(57) ABSTRACT

A method and arrangement to accomplish a self-acting function of one way flow in a conduit with minimal flow resistance is disclosed. A one way valve, which in an unaffected position blocks the conduit, is of a flexible, elastic material, and is arranged with a tight fit in connection to the inner surface of the conduit and is partially fixed along the inner circumference of the conduit by means of one or more parts having a surface with longitudinal/circumferential extension in the conduit. In case of pressure of a medium in one direction of the conduit, any flow will be blocked due to the fact that the pressure of the medium will press the non fixed parts of the one way valve against the inner surface of the conduit, whereby a completely tight element is formed. In addition, the non fixed parts of the one way valve collapse in case of pressure of the medium directed in the opposite direction, whereby a flow will be let through without any substantial resistance depending on the magnitude of the pressure.

6 Claims, 5 Drawing Sheets

METHOD AND ARRANGEMENT TO ACCOMPLISH A ONE-WAY FLOW

This application is a continuation of PCT/SE00/02524 filed Dec. 14, 2000.

FIELD OF INVENTION

The present invention concerns a method and arrangement to accomplish a self-acting, one-way flow in a conduit, with minimal flow resistance.

BACKGROUND

The existing self-acting check valves of the one-way type are dominated by tilting gates and check valves having a ball, a rubber diaphragm or a floating body. In common for all the above check valves is that they give rise to a flow resistance of large or small extent, in the conduit in which they are mounted. Furthermore, flow resistance, in large or small extent, gives rise to problems regarding clogging. Since reliability often is a quality sought after this leads to a demand for other solutions.

Especially check valves designed for mounting inside a conduit give rise to large flow restrictions. When applied for pressurised conduits the capacity of the pumps and sometimes the outer dimensions of the conduits must be amended to achieve a satisfying functionality. Due to the above this type of check valves are rarely used in practice, even tough they have considerable and sought after advantages. There are check valves having negligible flow resistance, however they have either a well or a chamber and are expensive both as such and to install in existing conduits.

Thus, one object of the present invention is to provide a simple and yet reliable method and means, by which a self-acting one-way flow may be established without giving rise to more than negligible flow resistance.

A further object of the invention is to make retrofit of such a one-way valve possible in an existing conduit without the need of any redesigns or changes of dimensions in connection to the assembly.

SUMMARY OF THE INVENTION

According to the invention a one-way valve, which in an unaffected condition closes off the conduit, is of a flexible, elastic material and is arranged with a tight fit to the inner surface of the conduit. It is partially fixed along the inner periphery of the conduit by means of one or more parts of its outer surface having a longitudinal/circumferential extension in the conduit, in such a way that in case of pressure from a medium in the conduit in a first direction a possible flow is blocked due to the pressure of the medium pressing the non fixed parts of the one-way valve against the inner surface of the conduit. Thus, a completely tight element is formed. Under influence of pressure of the medium in the opposite direction the non fixed parts of the one-way valve are brought to collapse/fold, whereby a flow, depending of the magnitude of the pressure is let through with negligible resistance.

According to a preferred embodiment of the invention the partial fixing of the one-way valve is done along half or less of the inner circumference of the conduit, whereby the one-way valve more or less will be in contact with the inner surface of the conduit when flow is allowed, depending on the pressure of the flow. By this feature, at maximum flow the one-way valve will be folded completely onto the inner surface of the conduit, whereby its radial extension in the conduit is almost negligible.

According to a further preferred embodiment of the invention the one-way valve is designed with an inherent elasticity returning it to its non deformed position, in which the one-way valve completely closes the conduit, when unaffected. This feature means that the material as such has an "inherent return spring", which closes the check valve in lack of flow and thus gives rise to no "minor flowers" in the blocked direction.

In a further embodiment the one-way valve in the partially fixed area or areas is fixed to the inside of the conduit along the entire length of the one-way valve. This gives the advantage that the one-way valve will adhere to a surface corresponding to almost the entire extent of the one-way valve in folded form, which in turn means that the strength of the bond between the one-way valve and the conduit is enhanced by the flow of the conduit.

BRIEF DESCRIPTION OF THE DRAWINGS

The invention will be described more closely below with reference to embodiments shown in the enclosed drawings, of which.

DETAILED DESCRIPTION

Figure 1A:
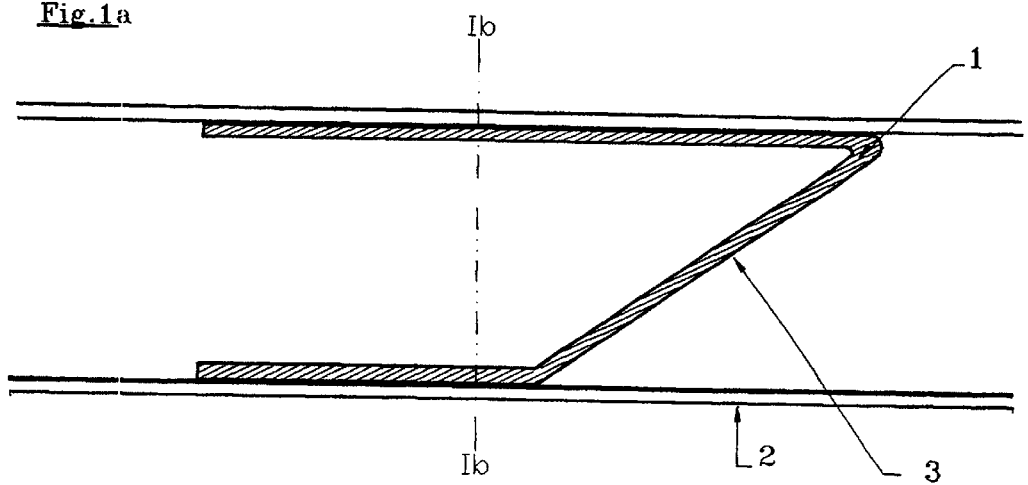
FIG. 1a shows a longitudinal section of a conduit portion having a one-way valve in order to accomplish the method and the means of the invention.

In FIG. 1a a longitudinal section of a one-way valve arrangement 1 is shown, intended for performing the method of the present invention. The arrangement 1 is placed in a conduit 2, to which it is adhered in a suitable way, e.g. by gluing. The conduit 2 may be of conventional design and be made of any material having a thickness of material going from the smallest to the largest foreseeable, and the diameter of which is adapted to the application. In this FIG. the conduit 2 and the one-way valve 1 are shown in a condition where they are not affected by any medium, such as sewage which they may be designed for. Furthermore, it is shown that, independent of the direction of the applied pressure, the surface of the one-way valve 1 facing the direction of the conduit 2 is inclined with an angle of 35°±10°, if the inclination is taken in view of the projection of the conduit as shown in FIG. 1a. The purpose of the inclination is to facilitate opening of the check valve at a direction of the pressure enabling such opening, at the same time as the inclination has the effect that breakthrough of a flow in the blocked direction is essentially obstructed.

Figure 1B:
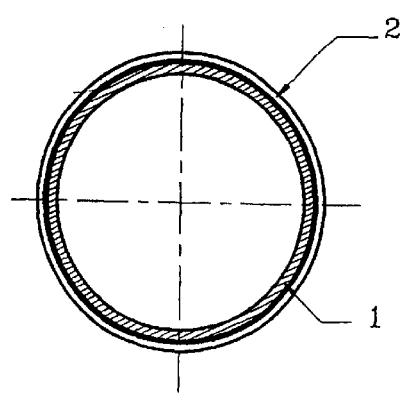
FIG. 1b shows a conduit portion corresponding to FIG. 1a, but in a cross section along the line Ib—Ib.

For clarifying reasons FIG. 1b shows that the outer periphery of the one-way valve 1 is completely in contact with the inner surface of the conduit 2. This may be accomplished in a compulsory way in that the one-way valve 1, at manufacture is furnished with parts (not shown), which elastically strive to withhold the original form of the one-way valve 1, as shown in FIG. 1a.

Figure 2A:
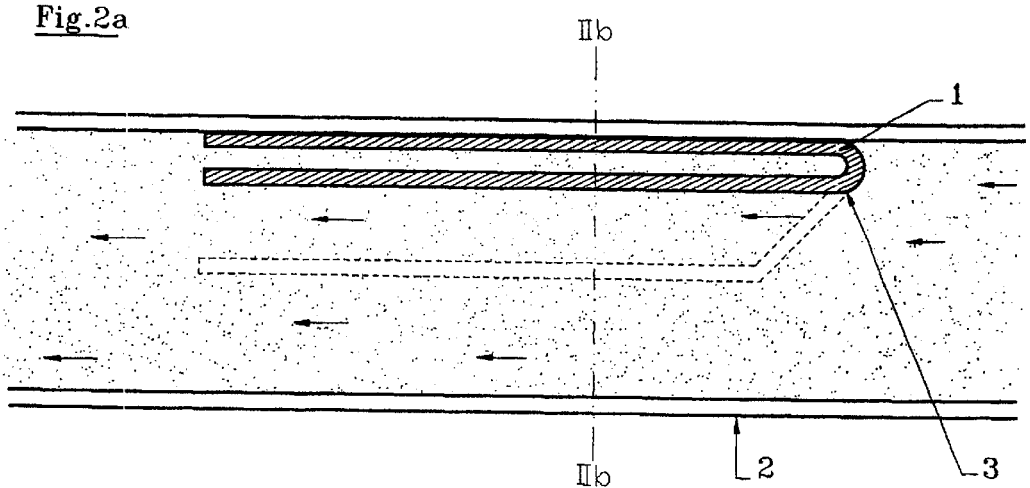
FIG. 2a shows a conduit portion corresponding to FIG. 1a but with the difference that a full flow runs in the conduit portion.
Figure 2B:
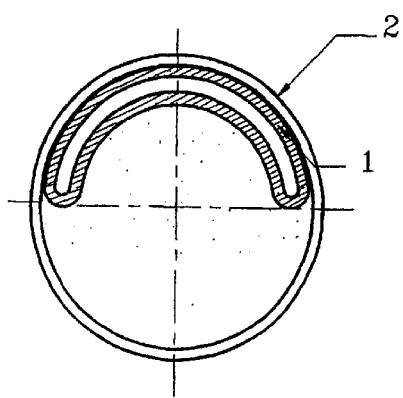
FIG. 2b shows a cross section along the line IIb—IIb of the same conduit portion as in FIG. 2a, with the same difference as between FIGS. 1a and 2a, respectively, i.e. no and full flow, respectively.

To avoid misunderstanding FIG. 2a shows how, according to the shown embodiment, the one-way valve 1 folds at full flow and is placed along one half of the inner surface of the conduit 2. The dimensions relating to the thickness of material of the one-way valve 1 are generally exaggerated in the figure, as it seems as the thickness of the material of the conduit is the same as the thickness of the material of the one-way valve. This is not the case, but the exaggeration is made deliberately in order to clearly show the deformation of the one-way valve at different flows. Henceforth, FIG. 2b shows analogous with FIG. 1b a cross section of the conduit 2 and one-way valve 1, in this case at full flow.

Figure 3A:
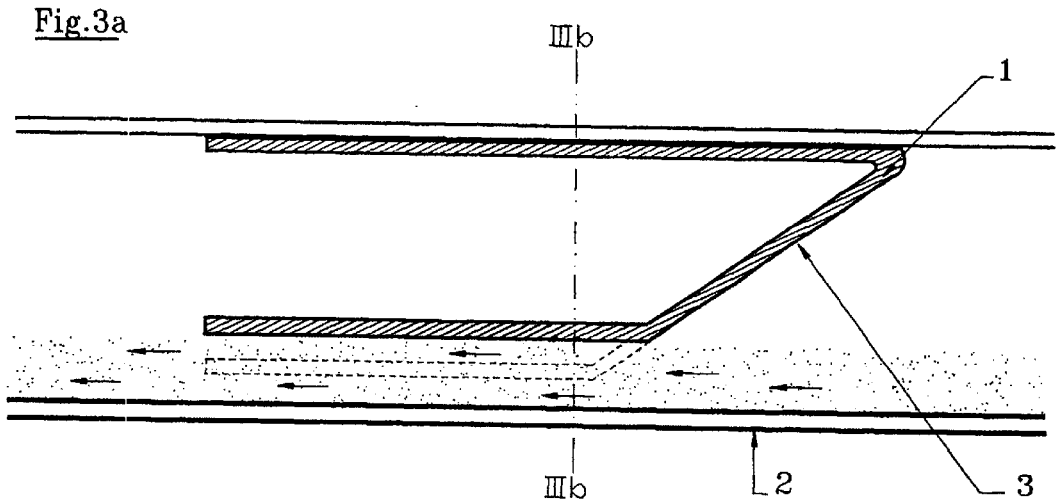
FIG. 3a shows a conduit portion corresponding to FIGS. 1a and 2a in which a limited flow runs.
Figure 3B:
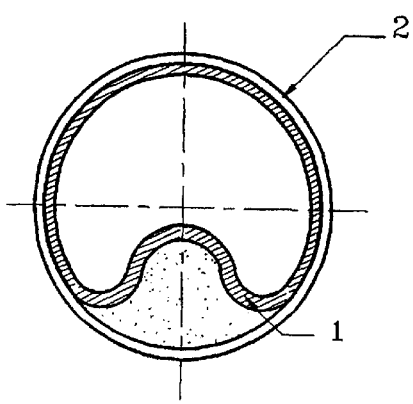
FIG. 3b shows a cross section along the line IIIb—IIIb corresponding to FIG. 2b at said limited flow.

Of course the check valve 1, 2 will function more or less independently of the magnitude of the pressure of the medium. This is shown in FIGS. 3a and 3b, respectively. In addition to a very low flow resistance, it can be said that the one-way valve 1 of the conduit 2 will open for pressures in the region of 10 mm of water, while in the opposite direction it can hold pressures of several meters of water. In FIGS. 3a and 3b, respectively, the conduit portion is shown at moderate flow of medium and specifically in FIG. 3b that the element of the one-way valve partially collapse at such a flow. Said Figs. at the same time show an intermediate condition in connection with a continuous transfer from a blocking position to total collapse/folding of the one-way valve when full pressure and thus full flow is applied.

Figure 4:
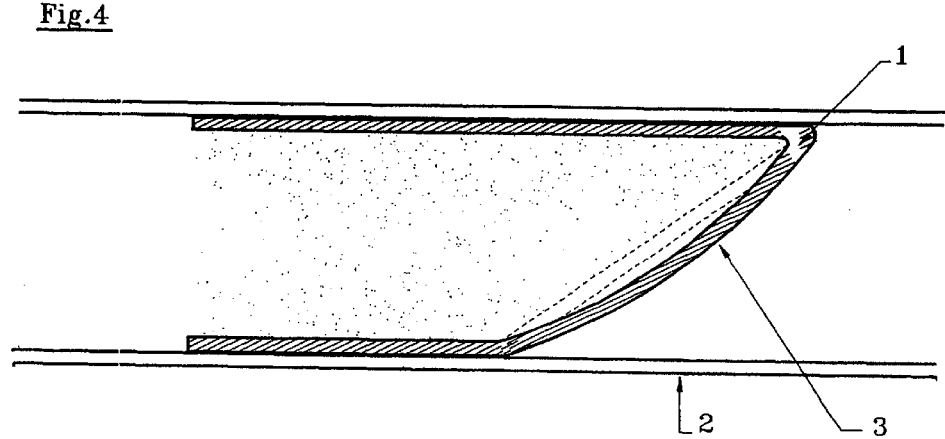
FIG. 4 shows a conduit portion corresponding to FIGS. 1a, 2a and 3a, respectively, at pressure in the opposite direction, i.e. the blocked direction.

FIG. 4 shows in an analogous way to the previous described Figs. the function of the one-way valve when a medium pressure is applied in the opposite direction, i.e. in the blocking direction. As shown the diaphragm part 3 of the one-way valve 1 will bulge under the influence of the pressure. Above all it is clearly shown that the pressure of the medium in the conduit in this blocking position will have the positive effect that the sealing effect will be increased as the pressure of the medium increases.

Figure 5A:
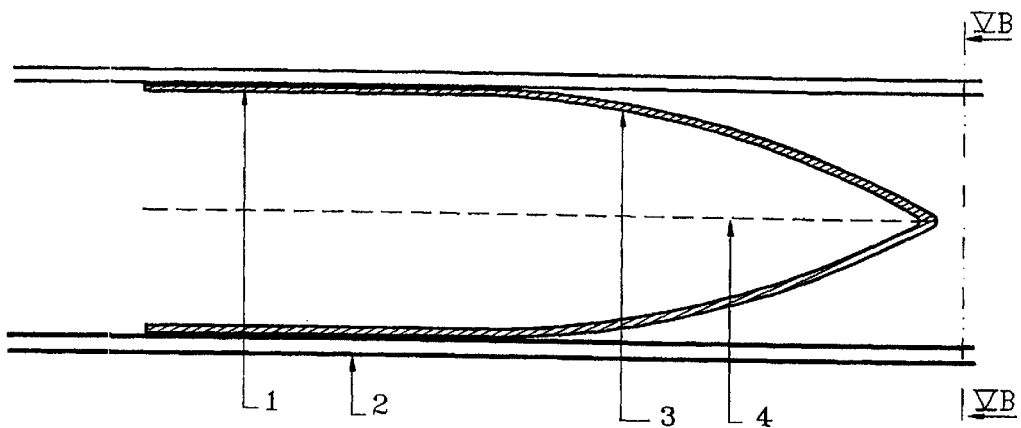
FIG. 5 shows analogous to FIGS. 1a–4 a longitudinal section of a conduit portion illustrating an alternative embodiment of the invention.
Figure 5B:
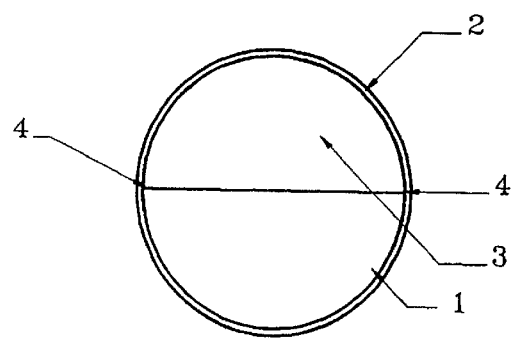

Finally, FIG. 5 shows an alternative embodiment of the invention, in which a one-way valve 1, having the same function as described above, is given a somewhat different design. In contrast to the above referred alternative, having an inclination, in this case the one-way valve 1 is more or less of a V-shape, seen in cross section, and thus has two different inclinations. This means that the one-way valve 1 in this case, in order to achieve a function corresponding to the function described in connection with the embodiment of FIGS. 1–4, is fixed to the inner surface of the conduit 2 along two linear lines of contact 4. However, the function of the check valve will be mainly the same, at the same time as the fulfilment of the objects and the advantages stated above stay mainly intact.

What is claimed is:

1. A self-controlling check valve arrangement for allowing a self-controlled one way flow in a conduit with minimal flow resistance, comprising:

a one way valve which will block the conduit when the pressure is the same on both sides of the one way valve, wherein the valve is arranged with a tight fit in the conduit and is partially fixed along an inner surface of the conduit by means of at least one part having a longitudinal/circumferential extension in the conduit, in order to block a flow in a first direction in case of pressure from a medium in the first direction, the pressure forming a tight element by means of the one way valve and to allow an almost unrestricted flow, depending on the magnitude of the pressure, in case of pressure in an opposite direction from the medium, wherein the surface, against which the pressure of a medium acts on the inside of the conduit, has an inclination of $35°±5°$ relation to the conduit in order to improve the operation especially at small differences of pressure.

2. The arrangement according to claim 1, wherein the partial fixation of the one way valve is up to half of the circumference of the conduit, whereby the one way valve when flow is allowed, depending on the pressure of th flow, will be in contact with the inner surface of the conduit in larger or smaller extent.

3. The arrangement according to 1, wherein the one way valve is designed to when unaffected automatically return to the non deformed position, due to the inherent elasticity, in which position the one way valve totally blocks the conduit.

4. The arrangement according to claim 2, wherein the one way valve in the area of the partial fixations is fixed to the inside of the conduit alone the total length of the one way valve.

5. The arrangement according to claim 4, wherein the one way valve is adhered to the inside of the conduit by glue.

6. The arrangement according to claim 1, wherein the check valve is received in a sewer.

* * * * *